United States Patent
Reasoner et al.

(10) Patent No.: US 7,251,092 B2
(45) Date of Patent: Jul. 31, 2007

(54) DATA TRANSFER APPARATUS AND METHOD FOR TRANSFERRING DATA

(75) Inventors: Kelly J. Reasoner, Fort Collins, CO (US); Gregg S. Schmidtke, Fort Collins, CO (US); Curtis C. Ballard, Eaton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/188,558

(22) Filed: Jul. 25, 2005

(65) Prior Publication Data

US 2007/0019318 A1 Jan. 25, 2007

(51) Int. Cl.
- G11B 15/18 (2006.01)
- G11B 25/04 (2006.01)
- G11B 15/68 (2006.01)
- G11B 19/02 (2006.01)

(52) U.S. Cl. .................... 360/69; 360/2; 360/92

(58) Field of Classification Search .......... None
See application file for complete search history.

(56) References Cited

U.S. PATENT DOCUMENTS

| 6,811,080 | B1* | 11/2004 | Gold et al. | 235/383 |
| 2002/0191322 | A1* | 12/2002 | Jerman | 360/69 |
| 2005/0078406 | A1* | 4/2005 | Topham | 360/92 |

\* cited by examiner

*Primary Examiner*—William Korzuch
*Assistant Examiner*—Jason Olson

(57) ABSTRACT

Data transfer apparatus may include a housing substantially conforming to a dimensional standard for a specified type of data cartridge. A reader mounted to the housing interrogates and receives data from a memory system provided on a data cartridge when the data transfer apparatus is positioned adjacent the data cartridge. A data transmission system mounted to the housing and operatively associated with the reader transfers data received by the reader to a data receiving system external to the data transfer apparatus.

23 Claims, 3 Drawing Sheets

DATA TRANSFER APPARATUS AND METHOD FOR TRANSFERRING DATA

BACKGROUND

Data storage libraries are well-known in the art and are widely used to store and retrieve large amounts of data. A typical data storage library contains a number of data cartridge storage locations as well as one or more cartridge read/write drives that are used to read data from and/or write data to data cartridges stored within the library. A robotic cartridge access system is commonly used to move the data cartridges between the cartridge storage locations and the cartridge read/write drives.

The data cartridges used in such data storage libraries are often provided with some type of cartridge identification system, such as a printed label having machine-readable information provided thereon, containing information about the data cartridge itself, as distinguished from the information stored on the storage medium (e.g., magnetic tape) of the data cartridge. In early systems, such data cartridge information tended to be limited, often to the volume number of the data cartridge itself. However, as data cartridges and library storage systems have become more advanced, it is common to provide even more detailed information about the data cartridge, such as, for example, information about the type of cartridge (e.g., data cartridge, cleaning cartridge, etc.) as well as the number of read/write cycles to which the data cartridge has been subjected.

Because of the increased amount of data cartridge information involved, most cartridge memory systems of the type just described commonly comprise RFID systems, although other types of cartridge memory systems may be used as well. In an RFID type of cartridge memory system, each individual data cartridge is provided with a transponder that, when interrogated (e.g., via a radio-frequency interrogation or "ping" signal), will transmit or broadcast (also via radio-frequency) data stored in the cartridge memory system. A suitable RFID "reader" is used to interrogate the transponder and receive the data transmitted by the transponder. Such readers are commonly located in the cartridge read/write devices provided in the library storage system. Consequently, information from the cartridge memory system can be downloaded from the cartridge memory system during a cartridge read/write operation. New or updated cartridge information can be uploaded during the cartridge read/write operation as well.

BRIEF DESCRIPTION OF THE DRAWINGS

Illustrative and presently preferred exemplary embodiments of the invention are shown in the drawings in which.

DETAILED DESCRIPTION

Figure 1:
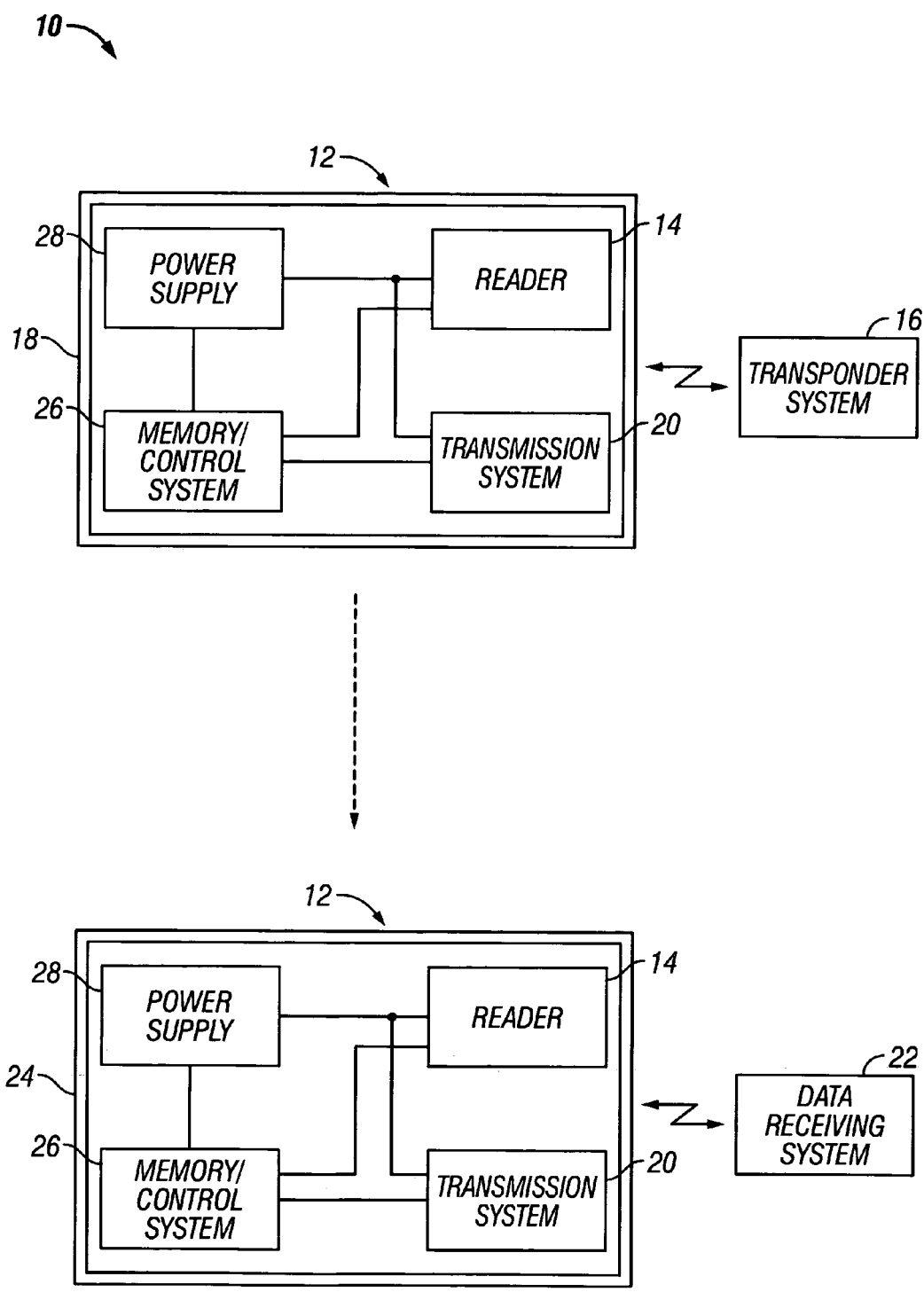
FIG. 1 is a block diagram of one embodiment of a data transfer apparatus.

One embodiment of data transfer apparatus 10 is illustrated in FIG. 1 and may comprise a housing 12 with a reader 14 mounted thereto. The reader 14 interrogates and receives data from a transponder 16 when the data transfer apparatus 10 is positioned within range of the transponder 16, e.g., when the data transfer apparatus is located at a reading position 18. The data transfer apparatus 10 also comprises a data transmission system 20 that is operatively associated with the reader 14. The data transmission system 20 transfers data received by the reader 14 to a data receiving system 22 external to the data transfer apparatus 10. By way of example, in one embodiment, the data transmission system 20 transfers data to the data receiving system 22 when the data transfer apparatus 10 is located at a data transmission position 24. In another embodiment, it is not necessary to first move the data transfer device 10 to a separate data transmission position 24 before transferring data.

The data transfer apparatus 10 may also comprise a memory/control system 26 for storing data received by the reader 14 and for controlling the operation of the data transfer apparatus 10. The data transfer apparatus 10 may also be provided with a power supply system 28 suitable for supplying electrical power to the various components of the data transfer apparatus 10.

In one embodiment, the housing 12 of the data transfer apparatus 10 may be sized or configured so that it substantially conforms to a dimensional standard for a specified type of data cartridge. For example, and with reference now to FIG. 2, the housing 12 may substantially conform to the dimensional standard for a linear-tape-open (LTO) type of data cartridge. Accordingly, the data transfer apparatus 10 may be readily used in a library storage system 30 (FIG. 3) designed to utilize LTO data cartridges 32.

Figure 3:
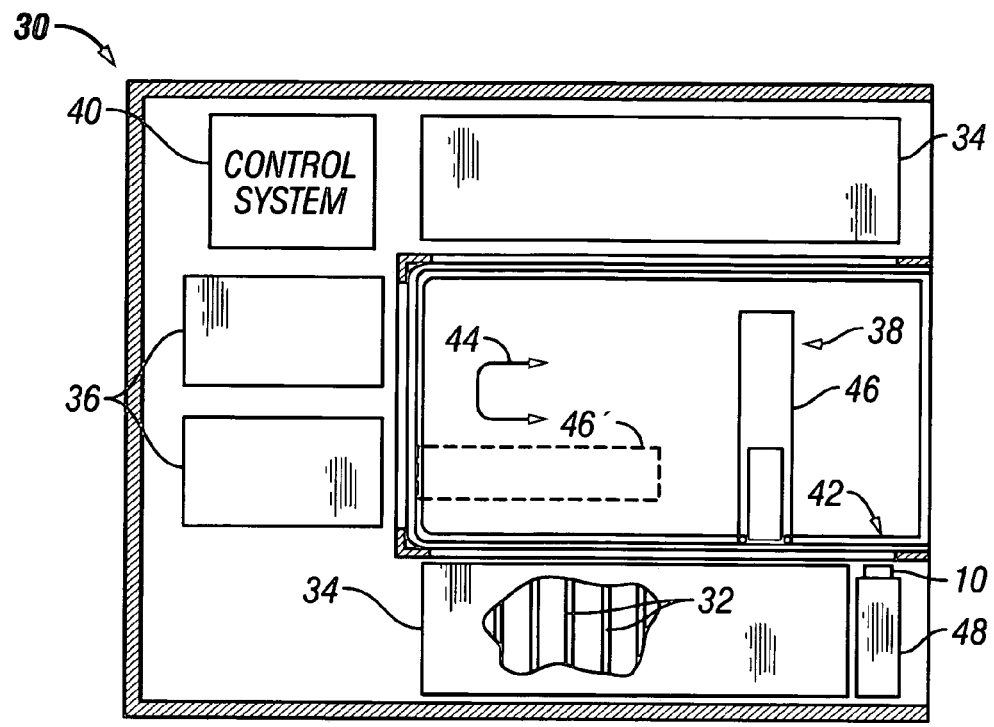
FIG. 3 is a plan view of a library storage system.

Referring now primarily to FIG. 3, the library storage system 30 may comprise a plurality of cartridge holding locations 34 and cartridge read/write devices 36 arranged in a generally U-shaped configuration, although other configurations are possible. The library storage system 30 may also include a cartridge access system 38 that can be operated to retrieve and transport data cartridges 32 between the cartridge holding locations 34 and the cartridge read/write devices 36.

As an illustration of the use of the library storage system 30, a host computer (not shown) may issue a request to access a data cartridge 32 stored in one of the cartridge holding locations 34 to read and/or write data thereto. In response, a control system 40 causes the cartridge access system 38 to be moved along a positioning system 42, i.e., in the directions of arrows 44, until the cartridge access system 38 is positioned adjacent the requested data cartridge 32 (e.g., at position 46). Once positioned, the control system 40 signals the cartridge access system 38 to withdraw a data cartridge 32 from the cartridge holding location 34. The control system 40 then instructs the cartridge access system 38 to move along the positioning system 42 until the cartridge access system 38 is adjacent the appropriate cartridge read/write device 36 (e.g., at position 46'). The data cartridge 32 is then loaded into the cartridge read/write device 36 for a data read/write operation.

In the embodiment of the library storage system 30 illustrated in FIG. 3, one or more of the data cartridges 32 may be provided with a transponder system 16 (e.g., FIG. 1) for storing data, such as data relating to the data cartridge 32. However, the cartridge access system 38 of the library storage system 30 may not contain a reader suitable for interrogating the transponder system 16 and for receiving data therefrom. While one or more of the cartridge read/write devices 36 may be provided with a reader system suitable for interrogating the transponder system 16 of the data cartridge 32, it can do so only when a data cartridge 32 is loaded in the read/write device 36. However, if the library storage system 30 is provided with the data transfer apparatus 10, the data transfer apparatus 10 may be used advantageously to interrogate and receive data from the transponders 16 of the various data cartridges 32, but without the need to first move the data cartridges 32 to a cartridge read/write device 36.

One method for using the data transfer apparatus 10 involves positioning the data transfer apparatus 10 adjacent a data cartridge 32 having a transponder system 16. The cartridge access system 38 may be conveniently used to position the data transfer apparatus 10 adjacent the data cartridge 32. When properly positioned (e.g., in the reading position 18 and within range of the transponder system 16, FIG. 1), the data transfer apparatus 10 generates an interrogation signal which is recognized by the transponder system 16 on the data cartridge 32. The transponder system 16 then transmits data which are received at the data transfer apparatus 10. The data transfer apparatus 10 may be used in this manner to collect data from the transponder systems 16 associated with any desired number of the data cartridges 32.

Figure 4:
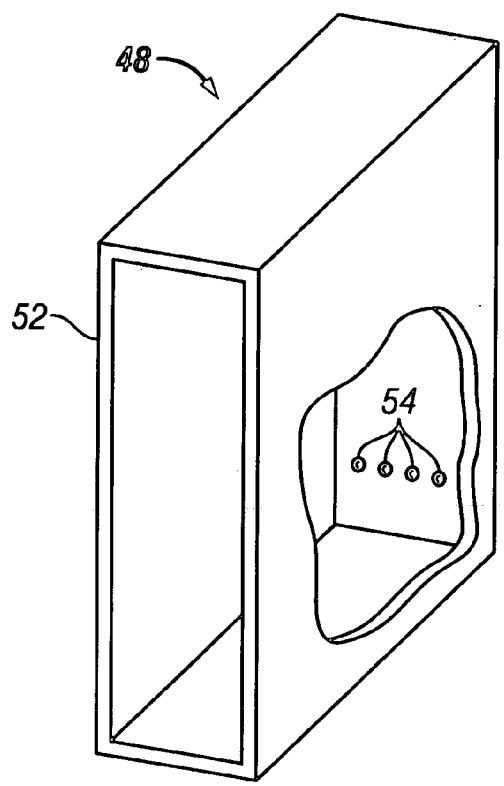
FIG. 4 is a perspective view of a docking station that may be used with the data transfer apparatus.

The data transfer apparatus 10 may then be used to re-transmit data from the transponder system(s) 16 to a data receiving system 22 (FIG. 1). In one embodiment, the data receiving system 22 may comprise a reader (not shown) provided in one or more of the cartridge read/write devices 36. Thus, the data may be transferred to the data receiving system 22 by inserting the data transfer apparatus 10 into the appropriate cartridge read/write device 36. Alternatively, other data receiving systems 22 may be used, as will be described in greater detail below. When not in use, the data transfer apparatus 10 may be stored in a vacant cartridge holding location 34. Alternatively, the data transfer apparatus 10 may be stored in a separate docking station 48, as best seen in FIGS. 3 and 4. In one embodiment, the docking station 48 is configured to interface with the data transfer apparatus 10 (e.g., to re-charge the power supply system 28) in a manner that will be described in greater detail below.

Having briefly described the data transfer apparatus 10 as well as some of its more significant features and advantages, various embodiments of the data transfer apparatus 10 will now be described in detail. However, before proceeding with the detailed description, it should be noted that the various embodiments shown and described herein are illustrative only and various changes and modifications to the apparatus, systems, and methods shown and described herein may be resorted to without departing from the scope of the present invention. For example, in the embodiments shown and described herein, the data cartridge is provided with a memory system that comprises a transponder (e.g., an RFID transponder). However, other systems may also be used. For example, in another embodiment, the memory system may comprise a simple bar-code label having machine-readable indicia provided thereon. In such an embodiment, the reader may comprise a bar-code reader or a camera system, as opposed to the RFID reader shown and described herein. Still other variations and modifications are possible, as would become apparent to persons having ordinary skill in the art after having become familiar with the teachings provided herein. Therefore, the present invention should not be regarded as limited to the particular apparatus and methods shown and described herein.

Referring back now to FIG. 1, one embodiment of data transfer apparatus 10 may comprise a housing 12. The housing 12 may comprise any of a wide range of configurations suitable for the intended application. For example, in the embodiment shown and described herein wherein it is desirable for the data transfer apparatus 10 to emulate a data cartridge 32 in a library storage system 30, i.e., so the data transfer apparatus 10 can be readily handled by the cartridge access system 38 as if it were a data cartridge 32, the housing 12 is made so that it substantially confirms to a dimensional standard for a specified type of data cartridge. In one embodiment, the specified type of data cartridge comprises a linear-tape-open (LTO) data cartridge 32. Accordingly, the housing 12 of data transfer apparatus 10 is made so that it substantially conforms to the LTO dimensional standard. Alternatively, the housing 12 may be made to conform to other dimensional standards, such as the digital linear tape (DLT) dimensional standard if the data transfer apparatus 10 is to be used in a DLT environment. In still another arrangement, the housing 12 need not conform to any dimensional standard at all and could instead be made of any size convenient for the intended application.

The housing 12 may be made from any of a wide range of materials (e.g., plastics) suitable for the intended application and for receiving the various systems and components described herein. Consequently, the housing 12 should not be regarded as limited to any particular type of material. However, by way of example, in one embodiment wherein the housing 12 is configured to substantially conform to the LTO dimensional standard, the housing is made from a moldable thermoplastic resin material.

A reader 14 may be mounted to or within the housing 12 so that the reader may be operatively associated with the particular type of memory system that is to be read. For example, in the embodiments shown and described herein, the memory system comprises a transponder system 16 and reader 14, wherein no physical contact is required between the reader 14 and the transponder system 16 in order for the reader 14 to read the data transmitted by the transponder system 16. However, contact type data transfer systems (e.g., bar-code systems) could be used as well. Therefore, the data transfer apparatus 10 should not be regarded as limited to any particular type of reader 14 and transponder system 16 shown and described herein. By way of example, in one embodiment, the reader 14 and transponder system 16 comprise an "RFID" type of system wherein the interrogation signal produced by the reader 14 and the data from the transponder system 16 are transmitted via radio-frequency. However, because such RFID systems are well-known in the art and could be easily provided by persons having ordinary skill in the art after having become familiar with the teachings provided herein, the particular RFID reader 14 that may be utilized in one embodiment of the data transfer apparatus 10 will not be described in further detail herein.

The data transfer apparatus 10 may also be provided with a data transmission system 20 suitable for re-transmitting data received by the reader 14. The data transmission system 20 may comprise any of a wide variety of systems and devices now known in the art or that may be developed in the future that would be suitable or desirable for the particular application. For example, in one embodiment wherein the reader 14 and transponder system 16 comprise an RFID type of data communication system, the data transmission system 20 may comprise a portion of the reader 14. That is, the data to be re-transmitted by the data transmission system 20 may be transmitted by the same antenna (not shown) utilized by the reader 14 to interrogate and receive data from the transponder system 16. Alternatively, the data transmission system 20 could comprise a separate data transmitter. For example, the separate data transmitter could utilize radio-frequency transmitter (e.g., a separate transmitter that transmits data in accordance with the Bluetooth® wireless data transfer protocol). Alternatively, the separate transmission system could utilize an infra-red data transmission system of the type well-known in the art.

Still other types of data transmission systems now known in the art or that may be developed in the future could be utilized, including contact-type data transmission systems, wherein physical electrical contact must be established between the data transmission system 20 and the data receiving system 22 in order for the data acquired by the data transfer apparatus 10 to be re-transmitted to the data receiving system 22. Consequently, the data transfer apparatus 10 should not be regarded as limited to any particular type of data transmission system.

The data transfer apparatus 10 may also be provided with a memory/control system 26 and a power supply system 28. The memory/control system 26 is operatively connected to the reader 14, the data transmission system 20, and the power supply system 28. The memory/control system 26 may be used to store data received by the reader 14 so that the received data may be re-transmitted by the data transmission system 20. The memory/control system 26 is also used to control the function and operation of the various components of the data transfer apparatus 10. For example, in one embodiment, the memory/control system 26 senses when the data transfer apparatus 10 is to be used to collect and transfer data in accordance with the teachings provided herein. At that time, the memory/control system 26 operates the reader 14 to broadcast an interrogation signal and await the receipt of incoming data from a nearby transponder 16. The memory/control system 26 may sense this condition by determining that the data transfer apparatus 10 has been removed from its holding location (e.g., a holding location 34 or a separate docking station 48), which may be indicated by sensing the state of a switch 50 (FIG. 2) provided at a suitable location on the housing 12. Alternatively, such a switch (e.g., switch 50) could be positioned on the housing 12 so that it is activated when the housing 12 is brought into close proximity to a data cartridge 32 having a transponder 16 that is to be interrogated. However, because systems (e.g., switches) for allowing the memory/control system 26 to determine when the data transfer apparatus 10 is to be used to collect data from a transponder system 16 could be readily provided by persons having ordinary skill in the art after having become familiar with the teachings provided herein, the particular system that is utilized in one embodiment of the data transfer apparatus 10 will not be described in further detail herein.

As mentioned, the data transfer apparatus 10 may also be provided with a power supply 28 suitable for operating the various components and systems comprising the data transfer apparatus 10. In one embodiment, the power supply 28 may be provided with a battery (not shown). The battery could comprise a disposable battery or a re-chargeable battery, depending on the preference of the user. If a disposable battery is used, the battery will need to be periodically replaced. If a re-chargeable battery is used, it will need to be periodically re-charged. When used in a library storage system 30 the battery can be replaced or re-charged by removing the data transfer apparatus 10 from the library storage system 30 at the appropriate times. Alternatively, the battery may be re-charged while the data transfer apparatus 10 is still within the library storage system 30. For example, and as is described below, a docking station 48 may be used to re-charge the battery.

Referring now to FIG. 4, a docking station 48 may be provided for use with the data transfer apparatus 10. The docking station 48 may comprise a housing 52 sized to receive the data transfer apparatus 10. In one embodiment, the docking station 48 is provided with a plurality of electrical contacts 54 sized to make electrical contact with corresponding contacts 56 (FIG. 2) provided on the housing 14 of data transfer apparatus 10. The electrical contacts 54 may be used to provide a path for electrical current to re-charge the battery of the power supply 28. In addition, and as will be described in greater detail below, such electrical contacts 54 may provide a means for downloading data collected by the data transfer apparatus 10, either as a replacement for, or in addition to, a non-contact data transmission system 20 that may be provided to the data transfer apparatus 10. The docking station 48 may be mounted at any convenient location within the library storage system 30 to provide a convenient storage location for the data transfer apparatus 10.

As already described, the data transfer apparatus 10 may be used to transfer (e.g., re-transmit) data received from the transponder system 16. The data may be transferred or re-transmitted to a data receiving system 22 that is external to the data transfer apparatus 10. See FIG. 1. Accordingly, the data receiving system 22 may be located at any of a wide variety of positions or locations. For example, in one embodiment wherein the data transmission system 20 comprises a portion of the RFID reader 14, the data receiving system 22 may comprise an RFID reader provided in one or more of the cartridge read/write devices 36. Thus, after acquiring data from the desired number of transponders 16, the data transfer apparatus 10 can then be loaded into the cartridge read/write device 36. The reader (not shown) in the cartridge read/write device 36 can then interrogate the data transfer apparatus 10 and receive all (or a portion) of the data collected by the data transfer apparatus 10.

In an alternative arrangement, the data receiving system 22 could be placed elsewhere in the library storage system 30, such as, for example, in the docking station 48 for the data transfer apparatus 10. However, because the location for the data receiving system 22 will depend to some degree on the particular environment in which the data transfer apparatus 10 is to be used, as well as on the particular type of data transmission system that is to be utilized, the present invention should not be regarded as limited to the particular types and locations of data receiving systems 22 shown and described herein.

In one exemplary embodiment, the data transfer apparatus 10 is configured to be utilized in a library storage system 30 containing a plurality of data cartridges 32 conforming to the LTO specification. Because the library storage system 30 is configured to be used with LTO data cartridges 32, the housing 12 of the data transfer apparatus 10 is configured so that it substantially conforms to the LTO dimensional standards. Thus, the data transfer apparatus 10 can be moved about within the library storage system 30 as if were a LTO data cartridge 32.

As already discussed, one or more of the LTO data cartridges 32 may be provided with a corresponding transponder system 16. The transponder system 16 may be provided with data relating to the data cartridge itself, as distinguished from the data stored on the medium (e.g., magnetic tape) contained within the data cartridge 32. In the embodiment shown and described herein, the cartridge access system 38 may lack the capability to interrogate and read data from the transponder systems 16 in the LTO data cartridges 32, although the data transfer apparatus 10 could be used even if the cartridge access system 38 had such capability. In addition, at least one of the cartridge read/write devices 36 is provided with a reader system (not shown) for interrogating and reading data from the transponder systems 16 provided in the LTO data cartridges 32, although this need not be the case, as already explained.

The data transfer apparatus 10 may be used to interrogate and read data from the transponder systems 16 of the various data cartridges 32, then transfer (e.g., re-transmit) that data to a data receiving system 22 (FIG. 1). For example, in the embodiment shown and described herein, the reader (not shown) provided in one or more of the cartridge read/write devices 36 comprises the data receiving system 22. Thus, after receiving data from the transponder systems 16 from the desired data cartridges 32, the data transfer apparatus 10 may be loaded into the cartridge read/write device 36 and the data re-transmitted to the data receiving system 22 (i.e., reader) provided in the cartridge read/write device 26.

Consider, for example, a situation wherein the data transfer apparatus 10 has been previously loaded into the library storage system 30 and currently resides in a docking station 48 provided within the library storage system 30. In order to use the data transfer apparatus 10 to collect data from the various transponder systems 16 associated with the LTO data cartridges, the cartridge access system 38 would engage and withdraw the data transfer apparatus 10 from the docking station 48. As mentioned, because the housing 12 of the data transfer apparatus 10 substantially conforms to the dimensional standard for the particular type of data cartridge (e.g., LTO) for which the cartridge access system 38 is designed to operate, the cartridge access system 38 will be able to handle the data transfer apparatus in the same manner as a conventional LTO data cartridge 32.

Figure 2:
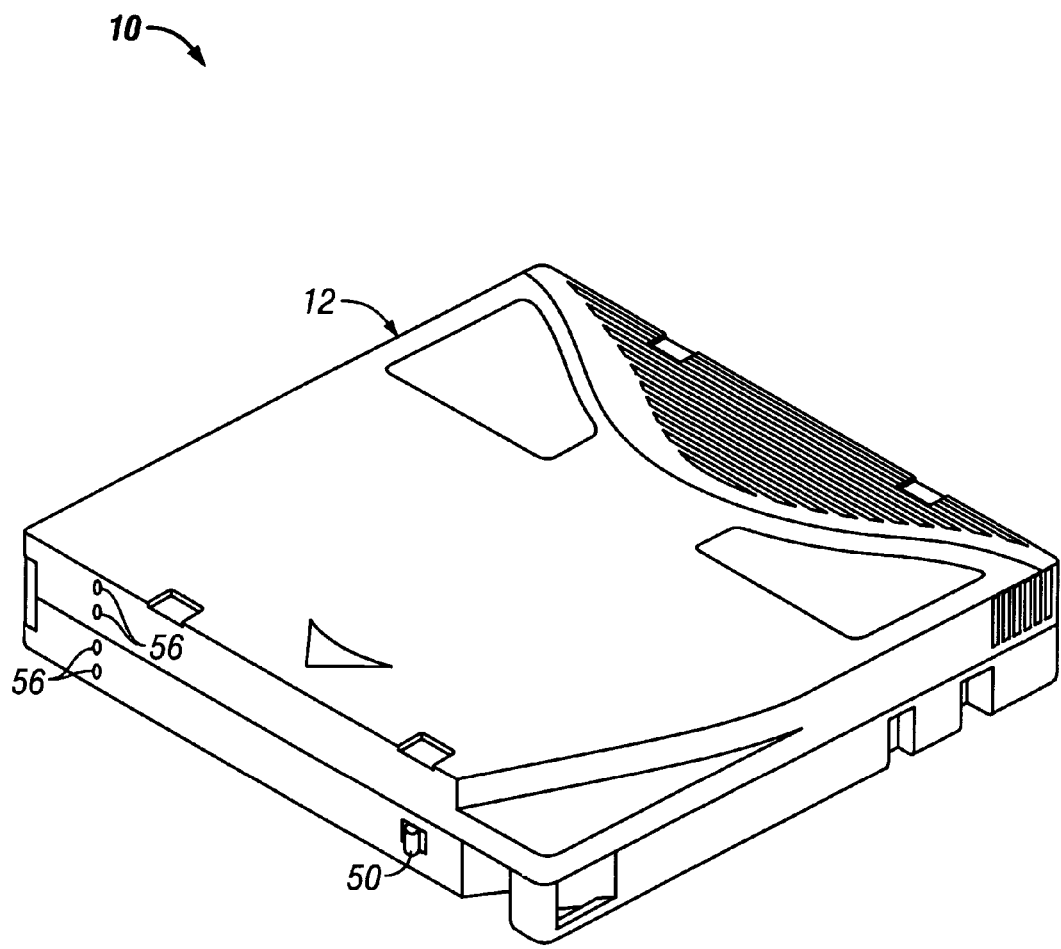
FIG. 2 is a perspective view of the data transfer apparatus as it may be configured to emulate a linear-tape-open (LTO) data cartridge.

After the data transfer apparatus 10 is withdrawn from its docking station 48, the memory/control system 26 may be used to activate the reader 14. As previously described, one way for the memory/control system 26 to activate the reader 14 would be by sensing the state of the switch 50 provided on the housing 14, as best seen in FIG. 2. The cartridge access device 38 can then be operated by the control system 40 of the library storage system 30 to move the data transfer apparatus 10 until it is positioned adjacent a data cartridge 32, i.e., within range of the transponder system 16 of the data cartridge 32. At this point, the activated reader 14 should successfully interrogate the transponder system 16 (FIG. 1) of the data cartridge 32 and receive data from the transponder system 16. The data received by the reader 14 may be stored in the memory/control system 26 of the data transfer apparatus 10. The data from any desired number of data cartridges 32 may be collected in this manner.

After collecting the data from the transponder systems 16 associated with the desired number of data cartridges 32, the data may then be transferred or re-transmitted to the data receiving system 22 (FIG. 1). Alternatively, the data may be transferred or re-transmitted at any convenient time. In one embodiment, the transfer or re-transmission of the data may be accomplished by using the cartridge access system 38 to load the data transfer system 10 into a cartridge read/write device 36 having a reader provided therein. The reader in the cartridge read/write device 36 thus functions as the data receiving system 22 (FIG. 1) and receives from the data transmission system 20 data that was previously downloaded from the transponder system 16 of the data cartridge 32.

Alternatively, if the data receiving system 22 comprises a separate system, i.e., is not provided with the cartridge read/write devices 36, then the data download operation can be conducted in accordance with the location and operational requirements of the particular data receiving system 22 that is used. For example, the data receiving system 22 could be provided as a component part of the docking station 48 for the data transfer apparatus 10. If so, the data transfer operation could be conducted when the data transfer apparatus 10 is returned to its docking station 48.

In still yet other embodiments, if the data transmission system 20 and data receiving systems 22 comprise infra-red data transmission systems, then the data transfer operation can be conducted when a suitable optical link is established between the data transmission system 20 and the data receiving system 22. Similarly, if the data transmission and receiving systems 20 and 22 comprise radio-frequency data transmission systems (e.g., a Bluetooth® wireless data transmission system), then the data transfer operation can be conducted when a suitable RF link is established between the data transmission and receiving systems 20 and 22.

In another embodiment wherein the data transmission and receiving systems 20 and 22 comprise contact type systems (e.g., wherein an electrical connection must be physically established between the data transmission system 20 and the data receiving system 22), the data transfer operation can be conducted when a suitable electrical connection has been established. In such an embodiment, the data receiving system 22 could be provided to the docking station 48, in which case a suitable electrical connection (e.g., via contacts 54 and 56) would be physically established between the data transmission system 20 and the data receiving system 22 when the data transfer apparatus 10 is inserted into the docking station 48.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. An imitation tape cartridge, comprising:
  a housing, said housing substantially conforming dimensions for a specified type of data cartridge;
  a reader mounted to said housing, said reader operable to interrogate and receive data from a memory system provided on a data cartridge when said imitation tape cartridge is engaged and transported with a movable cartridge access system to a position adjacent said data cartridge; and
  a data transmission system mounted to said housing and operatively associated with said reader, said data transmission system transferring data received by said reader to a data receiving system external to.

2. The imitation tape cartridge of claim 1 wherein said housing substantially conforms to linear-tape-open (LTO) dimensions.

3. The imitation tape cartridge of claim 1, wherein said housing substantially conforms to digital linear tape (DLT) dimensions.

4. The imitation tape cartridge of claim 1, wherein said memory system comprises a transponder.

5. The imitation tape cartridge of claim 1, wherein said reader comprises a radio frequency identification (RFID) reader.

6. The imitation tape cartridge of claim 5, wherein said RFID reader is capable of transmitting data and wherein said RFID reader comprises said data transmission system.

7. The imitation tape cartridge of claim 1, wherein said data transmission system comprises a wireless data transmission system.

8. The imitation tape cartridge of claim 7, wherein said wireless data transmission system comprises an infra-red data transmission system.

9. The imitation tape cartridge of claim 7, wherein said wireless data transmission system comprises a radio frequency data transmission system.

10. The imitation tape cartridge of claim 1, wherein said reader further comprises a memory system, said memory system storing data received by said reader.

11. An imitation tape cartridge, comprising:
a reader, said reader operable to interrogate and receive data from a transponder when said imitation tape cartridge is moved by a cartridge access system located in a library system and positioned within range of said transponder; and
a data transmission system operatively associated with said reader, said data transmission system operable to re-transmit data received by said reader to a data receiving system external to said imitation tape cartridge wherein the imitation tape cartridge has a shape of a data cartridge in a library storage system.

12. A data storage library, comprising:
a plurality of data cartridge holding locations;
at least one data cartridge sized to be received by at least one of said plurality of data cartridge holding locations, said at least one data cartridge comprising a transponder system, said transponder system operable to transmit data in response to an interrogation signal;
a cartridge access system operatively associated with said data storage library, said cartridge access system operable to retrieve said at least one data cartridge contained in at least one of said plurality of data cartridge holding locations;
an imitation tape cartridge sized to be retrievable by said cartridge access system so that said imitation tape cartridge is positionable adjacent a data cartridge by said cartridge access system, said imitation tape cartridge operable to interrogate and receive data from the transponder system on said data cartridge; and
a data receiving system operatively associated with said data storage library, said data receiving system operable to receive data from said imitation tape cartridge.

13. The data storage library of claim 12, wherein said at least one data cartridge conforms to dimensions and wherein said imitation tape cartridge substantially conforms to the dimensions.

14. The data storage library of claim 13, wherein the dimensions comprise linear-tape-open (LTO) dimensions.

15. The data storage library of claim 13, wherein the dimensions comprise digital linear tape (DLT) dimensions.

16. The data storage library of claim 12, wherein said imitation tape cartridge comprises:
a housing;
a reader mounted to said housing, said reader operable to interrogate and receive data from the transponder system; and
a data transmission system mounted to said housing and operatively associated with said reader, said data transmission system operable to transfer data received from the transponder system to said data receiving system.

17. A method, comprising:
moving an imitation tape cartridge having a shape and size of a media cartridge with a robotic picker in a library storage system to a location that is adjacent the media cartridge having a transponder system;
using said imitation tape cartridge to generate an interrogation signal, the interrogation signal causing the transponder system to transmit data;
receiving transmitted data at said imitation tape cartridge; and
using said imitation tape cartridge to re-transmit data received from the transponder system to a data receiving system.

18. The method of claim 17, wherein said positioning imitation tape cartridge comprises:
using a media access system to engage said imitation tape cartridge; and
operating the media access system to carry said imitation tape cartridge to a position adjacent the media cartridge.

19. The method of claim 18, further comprising operating the media access system to carry said imitation tape cartridge to a position adjacent the data receiving system before using said imitation tape cartridge to re-transmit data.

20. The method of claim 17, wherein using said imitation tape cartridge to re-transmit data comprises using said imitation tape cartridge to re-transmit data by a wireless communication link.

21. The method of claim 20, wherein using said imitation tape cartridge to re-transmit data by a wireless communication link comprises using said imitation tape cartridge to re-transmit data by a radio frequency communication link.

22. The method of claim 20, wherein using said imitation tape cartridge to re-transmit data by a wireless communication link comprises using said imitation tape cartridge to re-transmit data by an infra-red communication link.

23. A method, comprising:
engaging an imitation tape cartridge with a robotic picker in a cartridge library;
positioning the imitation tape cartridge with the robotic picker to a location that is adjacent a transponder located in a data cartridge, the imitation tape cartridge having a size and shape of the data cartridge;
using said imitation tape cartridge to generate an interrogation signal, the interrogation signal causing the transponder system to transmit data;
receiving transmitted data at said imitation tape cartridge; and
using said imitation tape cartridge to transfer data received from the transponder system to a data receiving system.

* * * * *

UNITED STATES PATENT AND TRADEMARK OFFICE
CERTIFICATE OF CORRECTION

PATENT NO. : 7,251,092 B2  Page 1 of 1
APPLICATION NO. : 11/188558
DATED : July 31, 2007
INVENTOR(S) : Kelly J. Reasoner et al.

It is certified that error appears in the above-identified patent and that said Letters Patent is hereby corrected as shown below:

In column 8, line 36, in Claim 1, after "conforming" insert -- to --.

In column 8, line 47, in Claim 1, after "external to" delete "." and insert -- said imitation tape cartridge. --, therefor.

In column 9, line 17, in Claim 11, insert -- , -- before "wherein".

Signed and Sealed this

Fifth Day of August, 2008

JON W. DUDAS
*Director of the United States Patent and Trademark Office*